United States Patent [19]
Thiel

[11] Patent Number: 5,249,646
[45] Date of Patent: Oct. 5, 1993

[54] ADJUSTING DEVICE FOR A BRAKE WITH RESETTING MEANS

[75] Inventor: Rudolf Thiel, Frankfurt am Main, Fed. Rep. of Germany

[73] Assignee: Alfred Teves GmbH, Frankfurt am Main, Fed. Rep. of Germany

[21] Appl. No.: 919,079

[22] Filed: Jul. 23, 1992

Related U.S. Application Data

[63] Continuation of Ser. No. 705,822, May 28, 1991, abandoned.

[30] Foreign Application Priority Data

May 26, 1990 [DE] Fed. Rep. of Germany ....... 4017065

[51] Int. Cl.⁵ .............................................. F16D 65/56
[52] U.S. Cl. .................................. 188/71.9; 188/72.6; 188/196 D; 192/111 A
[58] Field of Search ............... 188/71.9, 72.6, 196 BA, 188/196 D; 192/111 A

[56] References Cited

U.S. PATENT DOCUMENTS

| 3,392,806 | 7/1968 | Knapp ................................. 188/71.9 |
| 4,784,245 | 11/1988 | Fabbro et al. |
| 5,038,895 | 8/1991 | Evans ................................. 188/72.7 |

FOREIGN PATENT DOCUMENTS

| 1813560 | 12/1968 | Fed. Rep. of Germany . |
| 1675245 | 9/1971 | Fed. Rep. of Germany . |
| 2229368 | 1/1974 | Fed. Rep. of Germany ..... 188/71.9 |
| 2334154 | 1/1975 | Fed. Rep. of Germany ..... 188/71.9 |
| 3713201 | 10/1988 | Fed. Rep. of Germany . |
| 3802014 | 7/1989 | Fed. Rep. of Germany . |
| 3943106 | 7/1991 | Fed. Rep. of Germany . |
| 1239605 | 7/1971 | United Kingdom ............... 188/71.9 |
| 1343545 | 1/1974 | United Kingdom . |
| 2226093 | 6/1990 | United Kingdom . |

Primary Examiner—George E. A. Halvosa
Attorney, Agent, or Firm—Robert P. Seitter; J. Gordon Lewis

[57] ABSTRACT

Resetting of the actuator piston of a disc brake by an adjusting device is enabled by sliding movement of the piston so that a piston position may be reset without any special arrangement for turning an adjusting spindle (5), or by turning the piston itself. The adjusting spindle (5) is released for rotation during resetting, while the adjusting spindle (5) is normally fixed against rotation yet axially slidably during the time of hydraulic actuation and during manual braking.

6 Claims, 1 Drawing Sheet

ADJUSTING DEVICE FOR A BRAKE WITH RESETTING MEANS

CROSS REFERENCE TO RELATED APPLICATIONS

This application is a continuation of application Ser. No. 705,822, filed on May 28, 1991, now abandoned.

INTRODUCTION

The present invention relates to an automatic adjusting device with resetting means.

BACKGROUND OF THE INVENTION

In order not to unnecessarily extend the pedal travel for braking a vehicle with worn linings, it is known to provide automatically acting adjusting devices in which the initial position of the brake piston readjusts itself automatically depending on the brake lining's wear. Such adjusting devices can be furnished with a thread without self-locking engagement as described in more detail for instance in German published patent application 38 02 014.

The situation occurs in automatic adjusting devices of this type that the piston has moved relatively far from its initial position when the worn linings are replaced. To obtain space for fitting the new linings, it has been known to restore the piston to its initial position by virtue of resetting means. Such resetting means is known for example from German published patent applications 37 13 201, 18 13 560 and from German patent 16 75 245. It is a shortcoming in the known resetting means that either a threaded spindle is supported relative to the housing to be rotationally fixed, or the known adjusting devices are equipped with a non-reversible thread between nut and threaded spindle. From both measures ensues the disadvantage that either the piston must be screwed down to its initial position by a threaded spindle movement, or that the screw must be turned about its longitudinal axis on its end remote from the piston by means of a special drive in order to restore the piston into its initial position.

BRIEF DESCRIPTION OF THE INVENTION

Therefore, the present invention is based on an adjusting device in which the piston can be slid back into its initial position in the cylinder, after release of a stop mechanism, without having to turn the piston in doing so.

This object is achieved in an adjustment mechanism by a nut threadedly engaged with a non self locking thread on a spindle. The nut is spring urged into a non rotatable engagement with the piston.

The spindle is rendered non rotatable by a stop mechanism, but is movable longitudinally after the force of a spring is overcome.

The piston may be simply slid back into the cylinder bore, after release of the stop mechanism, with the non self locking thread causing rotation of the spindle to allow resetting of the initial piston position without rotation of the piston. The stop mechanism is necessary to prevent undesirable return movement of the piston, e.g., rotation otherwise taking place when braking due to the reaction forces exerted by the disc, or by the ring seal after termination of the braking operation. This applies correspondingly to the necessary prevention of a relative movement of the nut in relation to the spindle on actuation of the hand brake.

Rotary locking of the threaded spindle can be carried out by jamming, pinning or by any other form-locking arrangement, which though permitting movement of the threaded spindle in its longitudinal direction does not allow its rotation. Preferably, a sprocket is provided which engages the threaded spindle to establish a rotary connection while allowing longitudinal displacement. A locking screw engages the sprocket to prevent rotation whenever the locking screw is installed.

It may be expedient in many cases to arrange in addition to the possibility of pushing in the piston for assembly purposes also for the piston's resetting by means of a drive for rotating the threaded spindle. This may be the case when for any reasons whatsoever, the attempt fails to simply push back the piston in its longitudinal direction, for instance because the friction forces to be overcome are too large or the piston is impeded in its motion. The locking sprocket therefore may be configured to be engaged with a tool enabling rotation of the threaded spindle by rotation of the sprocket.

The sprocket may be taken out of the opening to release the threaded spindle or at least shifted out of engagement with the threaded spindle which still further assists the rotatability of the threaded spindle.

BRIEF DESCRIPTION OF THE DRAWINGS

The sole drawing FIGURE represents a cross-sectional view of a brake.

DETAILED DESCRIPTION OF THE PREFERRED EMBODIMENT OF THE INVENTION

Figure 1:
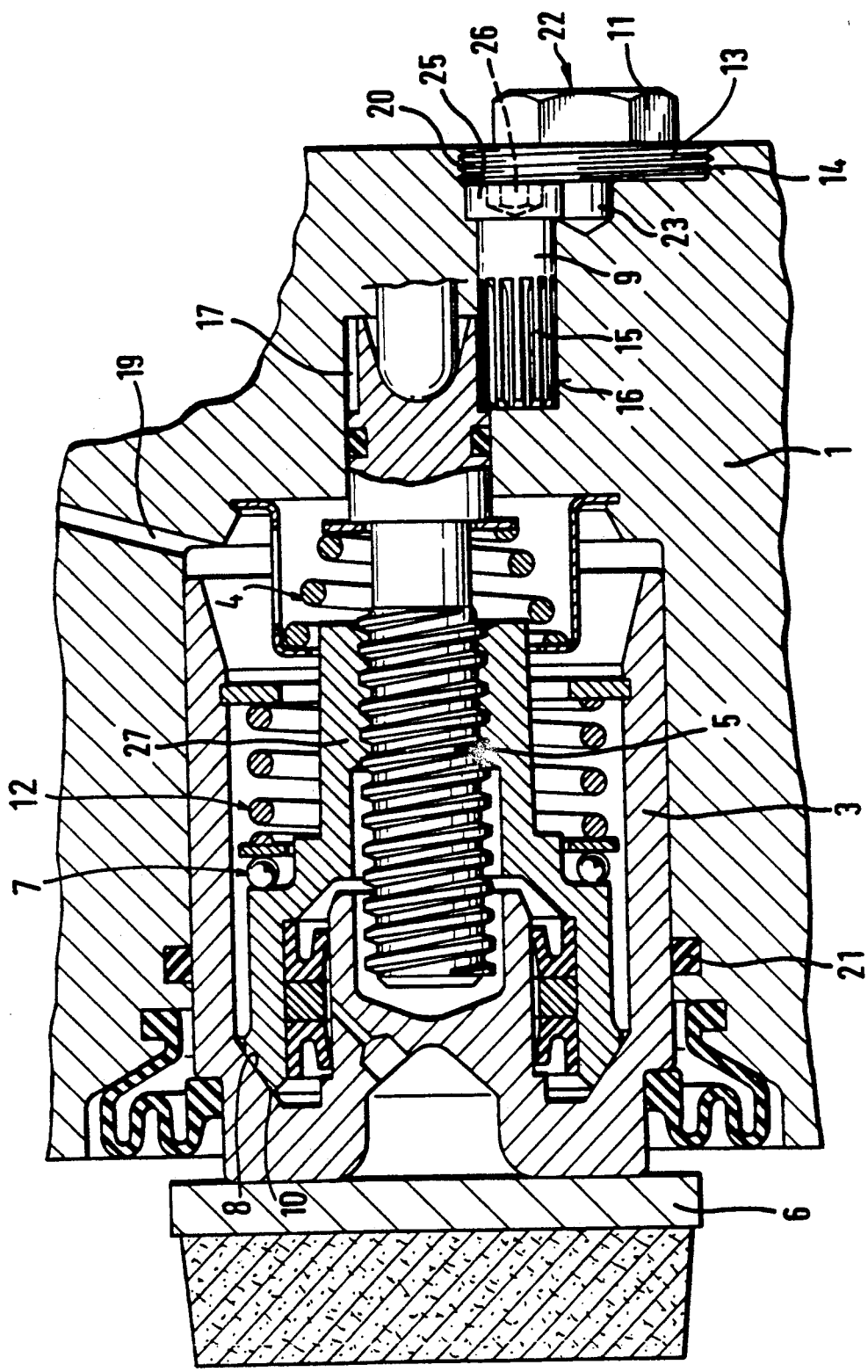

One embodiment of this invention will now be described with reference to the accompanying drawing showing a cross-sectional view of a brake, as is described for instance in German published patent applications 38 02 014 and 39 43 106. These two pieces of literature are herein made expressly the subject matter of the disclosure so that the assembly units to be gathered from the drawing will be described only inasfar as this is necessary for comprehending the present invention.

The cross-sectional view of a brake shown in the drawing shows a piston 3 which is guided in a cylinder opening of a housing 1, illustrated in cross-section. Pressure fluid entering through an opening 19 urges the brake piston 3 upon actuation in the left-hand direction in the drawing and, in doing so, applies a brake shoe 6 on a brake disc (not shown). In the normal condition in which the vehicle is able to be braked, a threaded spindle 5—as will still be explained hereinbelow—is displaceable in its longitudinal direction, while it is held against rotation. A nut 27 is threadedly mounted on the threaded spindle 5 with a non self locking thread. A first spring 12 has one end compressed against the inside of the piston 3 and other end engaging and interposed anti-friction bearing 7 to urge the nut 27 to the left as seen in the FIGURE, causing the nut 27 to firmly engage the piston 3. Complementary conical surfaces 8, 10 come into engagement to rotationally secure the nut 27 and piston 3 together. In the absence of any wear phenomena on the lining of the brake shoe, the piston is reset into its initial position by means of the restoring effect of a ring seal 21 after braking has been effected. In the event that the travel of the piston exceeds the clearance provided in the spindle thread, the nut 27 can separate from the piston 3, but under the urging of the first spring 12 rotates on the threaded spindle 5 to again engage the piston 3.

A second spring 4 acts to restrain axial movement of the threaded spindle to insure that the nut 27 will threadedly advance on the threaded spindle 5.

In a return movement of the piston after the thread clearance has been overcome rotation of the nut 27 in relation to the threaded spindle 5 will be prevented so that the piston 3, apart from the return movement through the clearance, substantially remains in its departed position, that means its readjusted position.

If the piston 3 is desired to be moved back into the cylinder opening in the housing 1 after installation of new brake linings, this could be carried out with the threaded spindle 5 locked only if the piston 3 is turned in the cylinder chamber, since the nut 27 is locked in relation to the piston 3 in this direction of movement and rotary movement of the nut 27 is thus possible only if the piston 3 is rotated.

However, such a rotary movement is not desirable according to this invention, it is rather desired that the piston be simply slidable in its longitudinal direction into the cylinder opening. To this end the invention proposes to permit a rotary movement of the threaded spindle 5 for the purpose of resetting so that, although the nut 27 is nonrotationably engaged in the piston 3, a force exerted in the longitudinal direction of the piston 3 into the cylinder chamber results in a rotary movement of the threaded spindle 5, which is thereby is threaded into the nut 27 and hence into the piston 3.

Since the thread between threaded spindle 5 and nut 27 is a non-self-locking thread, a like rotation per se is possible as well, as long as the threaded spindle 5 is released. A releasable locking mechanism is therefore provided in the form of a sprocket 15 which is fixed to prevent rotation, and which engages with toothing into a toothing fitting 17 of the threaded spindle 5 and thereby prevents the spindle 5 from rotating. To permit resetting of the piston, the sprocket 15 is disengaged from the toothing 17 by drawing the sprocket 15 out of a cylindrical opening 16 in the housing 1 to the right, as viewed in the drawing.

The sprocket 15 is furnished with an extension 9 carrying an extension head 25. Engaging the side of the attachment head 25 is a pin 23 of a stop screw 22, which through an external thread 13 is threaded into a thread 20 of an aperture 14 in the housing. The stop screw 22 comprises a head 11 on its outwardly facing end, which head 11 includes an external hexagonal contour or a hexagonal recess to permit its unthreading or threading tight, respectively. After detachment of the screw 22, the locking pin 23 is disengaged from the lateral surface of the attachment head 25 so that the locking engagement is removed and the sprocket 15 is permitted to freely rotate in the cylindrical opening 16. Hence, it follows that it is sufficient to disengage the screw 22 from the sprocket 15 in order to permit rotatability of the threaded spindle 5 without there being the need to take the sprocket 15 out of the cylinder opening 16 to this end.

In case the axial force available does not suffice to enable resetting of the piston 3 into the housing, the illustrated construction affords the possibility of retracting the piston through rotation of the sprocket 15. To this end, after detachment of the stop screw 22 a tool (not shown) is applied to the head 25 on the extension 9, for instance into a hexagonal recess 26 or slot provided in the head 25. The head 25 has a hexagonal recess or slot, respectively, to be able to turn the sprocket 15 in case of need and to thereby cause the piston 3 to adopt its initial position. The sprocket 15 is turned in a suitable fashion by a tool. As a result, the threaded spindle 5 will turn, whereby the nut 27 is threaded back and restores the piston into its initial position by way of elastic force or coil-bound spring force via the stop ring.

The threaded spindle 5 must be locked again after the piston 3 has been reset. This is done in that the screw 22 with the locking pin 23 is threaded in and thus is brought into engagement into the head 25 of the extension 9. Caused hereby, both the sprocket 15 and via the toothing 17 also the spindle 5 is rendered non-rotatable, yet axially slidable.

The present invention permits ease of rotation of the threaded spindle 5 and thus also ease of pressing the piston 3 in for resetting. This invention is apt both for floating-caliper brakes and for fixed-type caliper brakes and is to limited to the type of locking of the threaded spindle 5 shown in the drawing.

What is claimed is:

1. A disc brake having a brake housing formed with a cylinder bore, an actuator piston slidably mounted in said cylinder bore adapted to be axially advanced in an actuation direction with hydraulic pressure to actuate said brake, a self adjusting mechanism including a nut received within said piston; frictional engagement surfaces on said nut and said piston engaged upon axial advance of said nut towards said piston in said actuation direction; a threaded spindle extending within said nut and said piston and mounted to be axially movable therein in said actuation direction; a non locking threaded connection between said nut and said threaded spindle; a first spring carried by said piston and engaging said nut, urging said nut in the direction of movement of said piston during brake actuation and causing threaded advance of said nut on said non locking threaded connection with said spindle to be brought into engagement with said piston, said friction engagement surfaces engaged to lock said nut against further rotation; a second spring engaging said threaded spindle so as to resiliently restrain axial movement thereof in said actuation direction; said non locking threaded connection having a predetermined clearance allowing slight advancing movement of said engaged piston and nut on said threaded spindle, said piston separating from said nut upon axial displacement during actuation in excess of said clearance, with said nut thereby axially advanced on said threaded spindle by said first spring while said threaded spindle is held by said second spring; a mechanical actuator for axially advancing said threaded spindle to actuate said piston by axial advance of said nut; a releasable stop mechanism operable when engaged to prevent rotation of said threaded spindle to allow said spindle to axially advance of said nut and piston by said mechanical actuator but when released to allow free rotation of said threaded spindle; said threaded spindle mounted to be freely rotatable about a spindle axis extending in said direction of movement of said piston, said spindle freely rotatable whenever released by said stop mechanism, said stop mechanism including an element mounted in said housing for rotation about an axis extending parallel to said spindle axis; said element engaged with said spindle so as to be rotated with rotation of said spindle, a releasable lock for selectively locking said element against rotation, a tool engagement feature for enabling selective rotation of said element upon release of said releasable lock, whereby release of said threaded spindle by release of said element of the stop mechanism allows said nut to be retracted thereof by axial pushing retraction of said piston inducing said free rotation of said threaded spindle, said tool engagement feature enabling rotation of said element to assist rotation of said spindle and retracting of said piston and nut.

2. A disc brake according to claim 1 wherein said stop mechanism element comprises a sprocket rotatably mounted in said housing and having a toothed portion engaging a toothed portion of said threaded spindle.

3. A disc brake according to claim 2, wherein said releasable lock comprises a screw threaded into said housing and having a portion positively engaging said sprocket so as to prevent rotation thereof.

4. A disc brake according to claim 2 wherein said tool engagement feature comprises a recess in said sprocket accessible from without said housing, enabling rotation of said sprocket by a tool.

5. A disc brake according to claim 1, wherein said piston and nut have complementary conical surfaces comprising said frictional engagement surfaces moving into engagement as said nut rotates and advances on said threaded spindle under urging of said first spring.

6. A disc brake according to claim 1, further including a bearing interposed between said first spring and said nut to reduce rotational friction.

* * * * *